(12) United States Patent
Keramidas

(10) Patent No.: US 6,511,021 B1
(45) Date of Patent: Jan. 28, 2003

(54) THERMAL CONTROL SYSTEM FOR CONTROLLING TEMPERATURE IN SPACECRAFT

(76) Inventor: Nikolus A. Keramidas, 5500 Beech Ridge Dr., Fairfax, VA (US) 22030

( * ) Notice: Subject to any disclaimer, the term of this patent is extended or adjusted under 35 U.S.C. 154(b) by 48 days.

(21) Appl. No.: 09/630,184

(22) Filed: Aug. 1, 2000

(51) Int. Cl.$^7$ .................................................. B64G 1/58
(52) U.S. Cl. ..................................................... 244/163
(58) Field of Search ........................ 244/158 A, 158 R, 244/163, 173, 118.5

(56) References Cited

U.S. PATENT DOCUMENTS

| | | | |
|---|---|---|---|
| 3,647,165 A | * | 3/1972 | Whitla |
| 3,768,754 A | * | 10/1973 | Janes |
| 5,702,533 A | * | 12/1997 | Mundt et al. |
| 6,003,817 A | * | 12/1999 | Basuthakur et al. |
| 6,073,888 A | * | 6/2000 | Gelon et al. |
| 6,102,339 A | * | 8/2000 | Wu et al. |
| 6,279,857 B1 | * | 8/2001 | Roth |

FOREIGN PATENT DOCUMENTS

CA 960201 * 12/1974 .................. 244/163

OTHER PUBLICATIONS

Stern et al, "Magnetic Fields", Nasa. Http://www-istp.gsfc.nas.gov/Education/wmfield.html.*

* cited by examiner

Primary Examiner—Tien Dinh
(74) Attorney, Agent, or Firm—Rossi & Associates

(57) ABSTRACT

A thermal control system controls spacecraft's internal temperature without significantly increasing the mass of the spacecraft, thereby lowering launch expenses and allowing for the utilization of additional space and/or instrumentation on the spacecraft. The thermal control system incorporates at least one thermal control flap including a first magnetic field generator located thereon. A second magnetic field generator is located beneath the thermal control flap. A current regulation device is coupled to at least one of the first magnetic field generator and the second magnetic field generator. The first magnetic field generator generates a magnetic field that opposes a magnetic field generated by the second magnetic field generator causing the control flap to open and change the thermal reflective characteristics of the spacecraft.

7 Claims, 2 Drawing Sheets

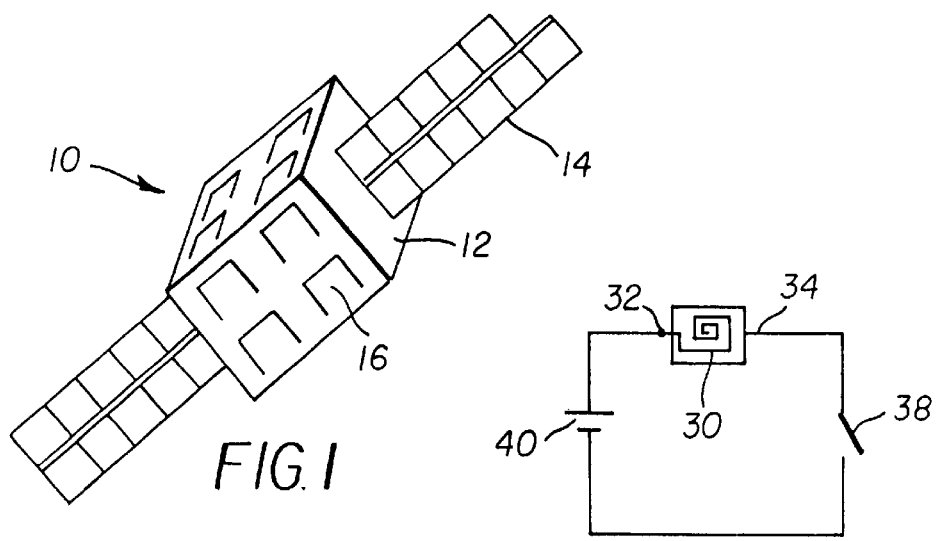
FIG. 1
FIG. 4
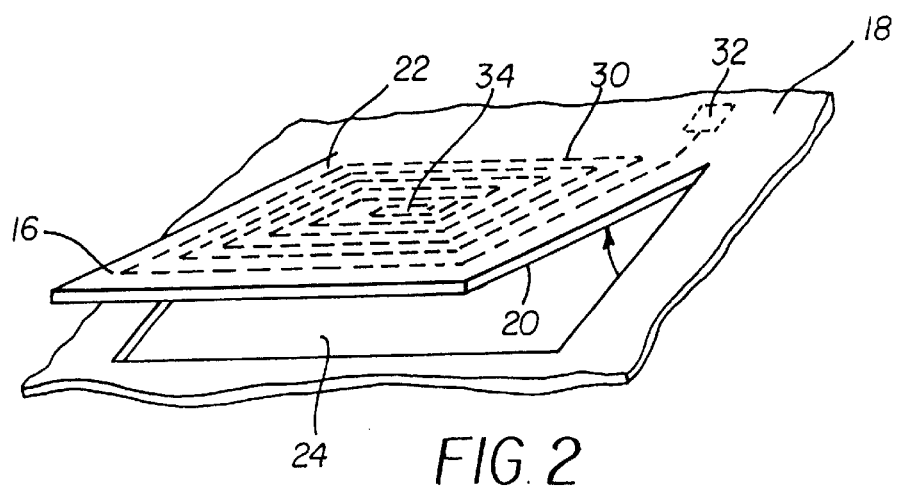
FIG. 2
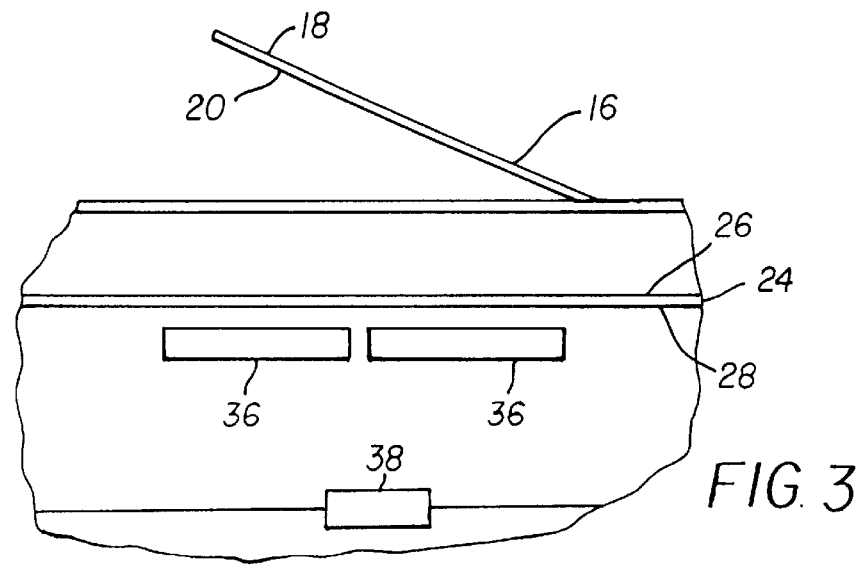
FIG. 3

THERMAL CONTROL SYSTEM FOR CONTROLLING TEMPERATURE IN SPACECRAFT

FIELD OF THE INVENTION

The invention relates in general to a system for controlling temperature in spacecraft. More specifically, the invention relates to an apparatus for controlling temperature in spacecraft through the use of moveable flaps to change the thermal reflective characteristics of the spacecraft.

BACKGROUND

Spacecraft orbiting Earth experience extreme changes in temperature that can have adverse affects on the spacecraft's internal components and system. Different types of thermal control systems are currently used in an attempt to regulate spacecraft temperature within a normal operating range including: multi-layer insulation, rotating solar cells, panels covered with optical solar reflectors and heat rejection antenna arrays. The current thermal control systems, however, add mass to the spacecraft that significantly raises launch expenses takes up valuable space that could he used for other purposes.

In view of the above, it is an object of the present invention to provide a completely autonomous thermal control system for controlling the internal temperature of a spacecraft without significantly increasing the mass of the spacecraft, thereby lowering launch expenses and allowing for the utilization of additional space and/or instrumentation.

SUMMARY OF THE INVENTION

The invention provides a completely autonomous thermal control system for controlling a spacecraft's internal temperature without significantly increasing the mass of the spacecraft, thereby lowering launch expenses and allowing for the utilization of additional space and/or instrumentation oil the spacecraft. The thermal control system incorporates at least one thermal control flap including a first magnetic field generator located thereon. A second magnetic field generator is located beneath the thermal control flap. A current regulation device is coupled to at least one of the first magnetic field generator and the second magnetic field generator. The first magnetic field generator generates a magnetic field that opposes a magnetic field generated by the second magnetic field generator. In a preferred embodiment, the first magnetic field generator comprises a conductive loop and the second magnetic field generator comprises permanent magnets. The positions of the conductive loop and permanent magnets, however, may be changed. In addition, the permanent magnets may be replaced with a second conductive loop.

Application of electrical energy to the first conductive loop causes a generation of a magnetic field that opposes a magnetic field generated by the permanent magnets of the second conductive loop. The force of the opposing magnetic fields causes the thermal control flap to rise, thereby changing tile thermal reflective characteristics of the spacecraft. Preferably, a thermal reflective layer is located beneath the thermal control flap such that raising the thermal control flap increases the thermal reflective capability of the spacecraft.

Other advantages and features of the invention will become apparent to those of ordinary skill in the art from the following detailed description of the preferred embodiments of the invention.

BRIEF DESCRIPTION OF THE DRAWINGS

The invention will be described in greater detail with reference to certain preferred embodiments thereof and the accompanying drawings, wherein:

FIG. 1 is a perspective view of a spacecraft including thermal control flaps in accordance with the present invention;

FIG. 2 is a perspective view of a thermal control flap in a raised position;

FIG. 3 is a side view of a thermal control flap in a raised position;

FIG. 4 is an electrical schematic illustrating the connection of an electrically conductive loop of the thermal control flap to a power source of the spacecraft and a thermal control switch;

DETAILED DESCRIPTION OF THE PREFERRED EMBODIMENTS

Figure 5:
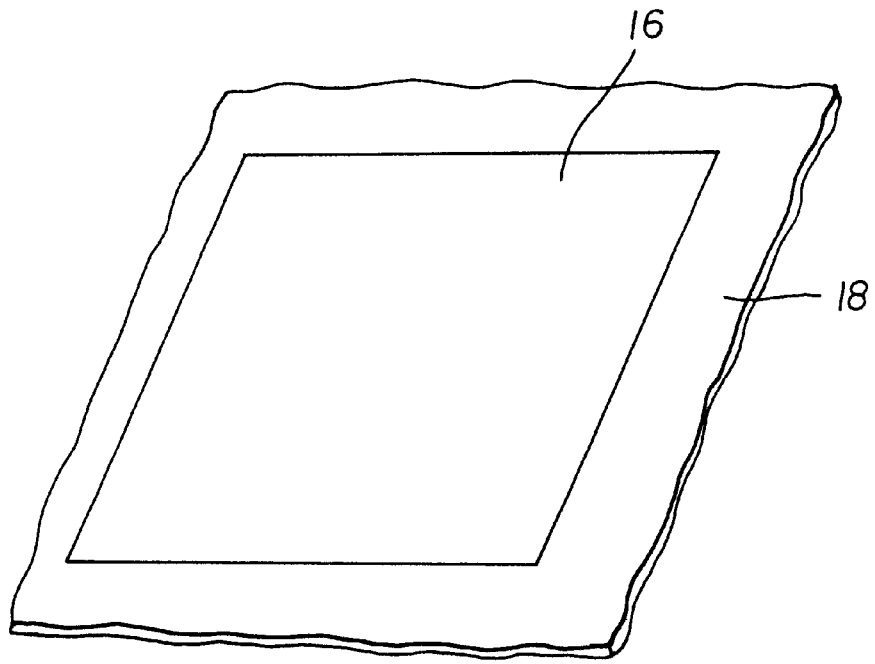
FIG. 5 is a perspective view of a thermal control flap in a lowered position.

Referring now to FIG. 1, an unmanned satellite 10 is illustrated as including a main body 12 containing various instrumentation and solar panels 14 for generating electricity to operate the instrumentation within the main body 12. One or more thermal control flaps 16 are provided on the main body 12 in order to regulate its internal temperature by changing the thermal reflective characteristics of the unmanned satellite 10. As shown in FIG. 2, the thermal control flaps 16 are formed in an outer protective layer 18 of the unmanned satellite 10. An inner surface 20 of the outer protective layer is coated with aluminum while an outer surface 22 of the outer protective layer is not coated with aluminum. The outer protective layer 18 covers an inner protective layer 24, which has an outer surface 26 that is coated with aluminum and an inner surface 26 that is not coated with aluminum. The outer protective layer 18 and the inner protective layer 24 are preferably made of aluminum coated Mylar™, although other materials may be readily utilized. Similarly, while the preferred implementation uses an aluminum coating, other reflective coatings or separate reflector devices may also be utilized.

The basic elements of the invention thermal control system will be described with reference to FIGS. 2–4. Each thermal control flap 16 includes a magnetic field generator, preferably in the form of an electrically conductive loop 30 having a first electrical connection 32 and a second electrical connection 34. In the illustrated embodiment, the electrically conductive loop 30 is provided on the inner surface 20 of the outer protective layer 18, specifically by etching the aluminum coating contained thereon. In the top perspective view illustrated in FIG. 2, the electrically conductive loop 30 is illustrated in phantom, as it is actually located on the inner surface 20. A second magnetic field generator, illustrated in FIG. 3 as permanent magnets 36 located beneath the inner protective layer 24, is provided under each of the thermal control flaps 16. The second magnetic field generator generates a magnetic field in opposition to the magnetic field generated by the first magnetic field generator. A current regulation device, preferably in the form of a thermal control switch 38, is also located beneath the inner protective layer 22 at a location within the main body 12 that is preferably most sensitive to thermal variations. As illustrated in FIG. 4, the electrically conductive loop 30 and the thermal control switch 38 are connected to a power source 40 of the satellite 10, such that operation of the thermal control switch 38 selectively controls tile flow of electricity through the electrically conductive loop 30.

The operation of the thermal control flap 16 will now be described. The satellite 10 experiences extreme cold when it travels behind the Earth and is shaded from solar radiation. In this cold state, the thermal control switch 38 opens and prevents the flow of electricity through the electrically conductive loop 30. With no current flowing through the electrically conductive loop 30, the thermal control flap 16 remains in a lowered position completely covering the inner protective layer 24 as shown in FIG. 5. With the thermal control flap 17 lowered, the thermal reflective capabilities of the satellite 10 are minimized and its ability to absorb any available thermal energy is maximized.

When the satellite 10 travels in front of Earth and is exposed to direct solar radiation, the internal temperature of the spacecraft 10 increases dramatically. The increase in temperature causes the thermal control switch 38 to close, thereby causing electricity to flow through the electrically conductive loop 30. The current flowing through the electrically conductive loop 30 causes the generation of a magnetic field that opposes the magnetic field generated by the permanent magnets 36. The force created by the opposing magnetic fields causes the thermal control flaps 16 to rise, thereby exposing the reflective outer surface 26 of the inner protective layer 24. Thus, raising the thermal control flap 16 changes the thermal reflection characteristics of the satellite 10 allowing internal temperature to be controlled by the operation of one or more of the thermal control flaps 16.

Figure 6:
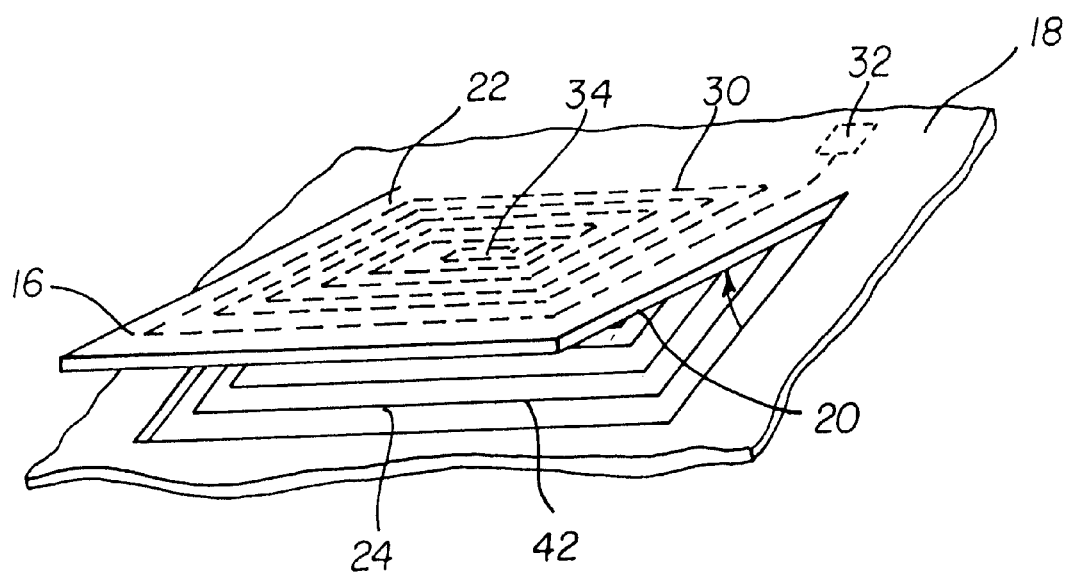
FIG. 6 is a perspective view of a second embodiment of the invention including a second conductive loop.

The invention has been described with reference to certain preferred embodiments thereof. It will be understood, however, that modifications and variations are possible within the scope of the appended claims. For example, the permanent magnets 36 may be replaced with another type of magnetic field generator. FIG. 6, for example illustrates the use of a second conductive loop 42 that is etched into the outer surface 26 of the inner protective layer. The second conductive loop 42 can be activated by the same thermal control switch 38 used to control current flow to the first conductive loop 30 or can be controlled by a separate current control device. Further, it will be understood by those skilled in the art that the outer protective layer 18 and the inner protective layer 24 need not be composed of aluminum coated material in which the first and second conductive loops are etched, but instead, the conductive loops may be adhered to or otherwise affixed to the outer protective layer 18 and inner protective layer 24 with a suitable adhesive or other mechanical bonding technique. Similarly, the inner protective layer 24 need only consist of a thermal reflective material located beneath the thermal control flap 16. Still further, while the opposition of magnetic force is the preferred method of controlling movement of the thermal control flap 16, other alternatives are possible including, a hinge device composed of a material that expands or contracts based on temperature, the use of a memory metal (such as Nitinol) in a control lifting device or any other suitable mechanism. In addition, the location of the first electrical loop and the permanent magnets in the first illustrated embodiment can be switched. Also, while the invention has been described with referenced to an unmanned satellite, it will be understood that the invention is applicable to any type of spacecraft including manned spacecraft.

What is claimed:

1. A thermal control system for a spacecraft comprising:

a thin film outer layer provided around a main body of the spacecraft, wherein the outer layer includes at least one thermal control flap moveable between an open position and a closed position, and wherein the thermal control flap comprises a portion of the thin film outer layer;

a first magnetic field generator located on the thermal control flap of the outer layer, wherein the first magnetic field generator generates a first magnetic field;

a second magnetic field generator located on the main body of the spacecraft beneath the thermal control flap, wherein the second magnetic field generator generates a second magnetic field;

control circuitry coupled to at least one of the first magnetic field generator and the second magnetic field generator, wherein the control circuitry controls at least one of the first magnetic field and the second magnetic field in response to a temperature condition of the main body of the spacecraft such that the first magnetic field opposes the second magnetic field to open the thermal control flap.

2. A thermal control system for a spacecraft as claimed in claim 1, wherein the first magnetic field generator comprises a conductive loop.

3. A thermal control system for a spacecraft as claimed in claim 2, wherein the second magnetic field generator comprises permanent magnets.

4. A thermal control system for a spacecraft as claimed in claim 2, wherein the second magnetic field generator comprises a second conductive loop.

5. A thermal control system for a spacecraft as claimed in claim 1, wherein the first magnetic field generator comprises permanent magnets and the second magnetic field generator comprises a conductive loop.

6. A thermal control system for a spacecraft as claimed in claim 1, further comprising a thermal reflective layer located beneath the thermal control flap.

7. A thermal control system for a spacecraft as claimed in claim 1, wherein the control circuitry comprises a current regulation device.

* * * * *